FEEDING MECHANISM FOR DOCUMENTS AND THE LIKE

Filed Dec. 11. 1961 6 Sheets-Sheet 1

INVENTOR.
LUTHER G. SIMJIAN
BY
Ervin B. Steinberg
AGENT.

Oct. 20, 1964 L. G. SIMJIAN 3,153,483

FEEDING MECHANISM FOR DOCUMENTS AND THE LIKE

Filed Dec. 11, 1961 6 Sheets-Sheet 2

INVENTOR.
LUTHER G. SIMJIAN
BY Ervin B. Steinberg
AGENT.

Oct. 20, 1964 L. G. SIMJIAN 3,153,483

FEEDING MECHANISM FOR DOCUMENTS AND THE LIKE

Filed Dec. 11, 1961 6 Sheets-Sheet 3

INVENTOR.
LUTHER G. SIMJIAN
BY Ervin B. Steinberg
AGENT.

Oct. 20, 1964 L. G. SIMJIAN 3,153,483

FEEDING MECHANISM FOR DOCUMENTS AND THE LIKE

Filed Dec. 11, 1961 6 Sheets-Sheet 4

INVENTOR.
LUTHER G. SIMJIAN
BY Ervin B. Steinberg
AGENT.

FEEDING MECHANISM FOR DOCUMENTS AND THE LIKE

Filed Dec. 11, 1961 6 Sheets-Sheet 5

INVENTOR.
LUTHER G. SIMJIAN
BY
Ervin B. Steinberg
AGENT.

*INVENTOR.*
LUTHER G. SIMJIAN
*BY*
Ervin B. Steinberg
AGENT.

United States Patent Office 3,153,483
Patented Oct. 20, 1964

3,153,483

FEEDING MECHANISM FOR DOCUMENTS AND THE LIKE

Luther G. Simjian, Greenwich, Conn., assignor to Universal Match Corporation, Ferguson, Mo., a corporation of Delaware Filed Dec. 11, 1961, Ser. No. 158,420
11 Claims. (Cl. 209—73)

The present invention concerns automatic vending apparatus and currency change mechanisms and has particular reference to devices of the kind which accept paper currency.

More particularly, the invention relates to a mechanism for feeding currency documents to a sensing station, to means for determining the acceptability of the document when the latter is at rest at said station, and to means which either feed the document from the sensing station to a deposit receptacle or, if the document is rejected, return the respective document.

While the prior art discloses various arrangements for performing the functions described heretofore, most of these prior art devices make use of rather complicated and involved mechanisms. The instant arrangements as its principal object discloses various improvements primarily, an arrangement wherein a document fed through a set of feed rollers is brought to alignment underneath scanning means which are disposed above a platform adjacent to the feed rollers. Gate means at the platform aid in the alignment of the document and prevent the document from reaching a storage receptacle until control means connected to the scanning means determine that the document is acceptable. If the document is acceptable, the gate means move from their normal blocking position and drive means associated with the platform remove the document to the storage receptacle. In the event that the document is found to be unacceptable, the gate means interposed between the platform and the receptacle remain in the blocking position, and the drive means cause the document to be fed from the platform through the feed rollers for return to the person using the apparatus.

Additionally, the instant apparatus discloses means which move scanning means relative to the document while the document is retained stationary on the platform.

Other and further objects and features of the present invention will be apparent more clearly by reference to the following description when taken in conjunction with the accompanying drawings in which.

Figures 1, 6, 7, 8, 9:
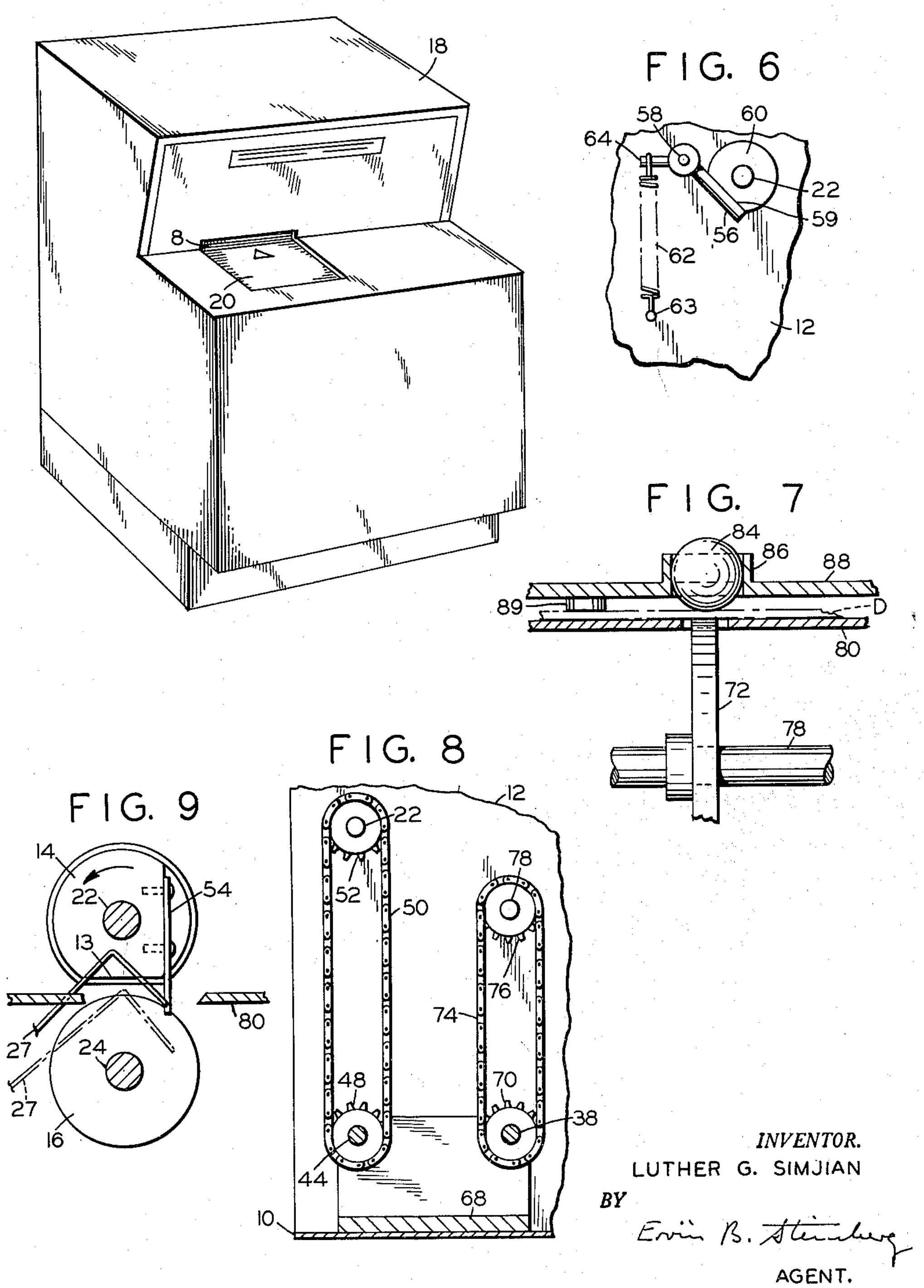
FIGURE 1 is a perspective view of a completed model of the present invention.
FIGURE 6 is a view of the detent mechanism as seen from lines 6—6 of FIGURE 2.
FIGURE 7 is a sectional view taken along lines 7—7 of FIGURE 2.
FIGURE 8 is a sectional view taken along lines 8—8 of FIGURE 2.
FIGURE 9 is a sectional view taken along lines 9—9 of FIGURE 2.

Referring now to the figures and FIGURE 1 in particular, an enclosure 18 houses substantially all of the mechanism. The enclosure is provided along a horizontal desk type surface with a ledge 20 which is aligned with an aperture 8 through which documents and the like are inserted into the enclosure and through which documents rejected are returned from the enclosure. Behind aperture 8, there is disposed substantially all of the feeding and sensing mechanism which constitutes the principal subject of the present invention.

Figure 2:
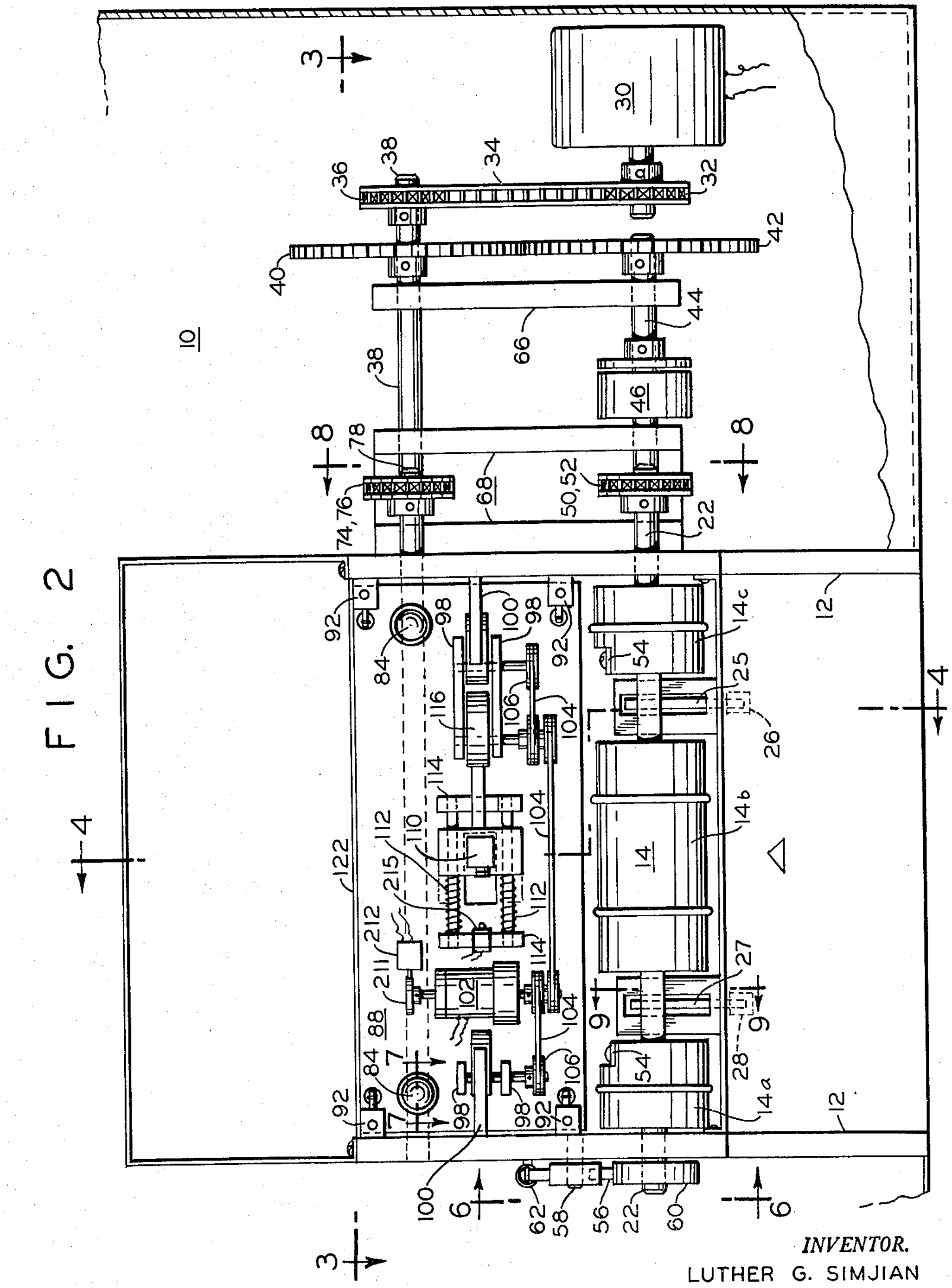
FIGURE 2 is a plan view of the mechanical arrangement of the present invention, with housing removed.
Figure 3:
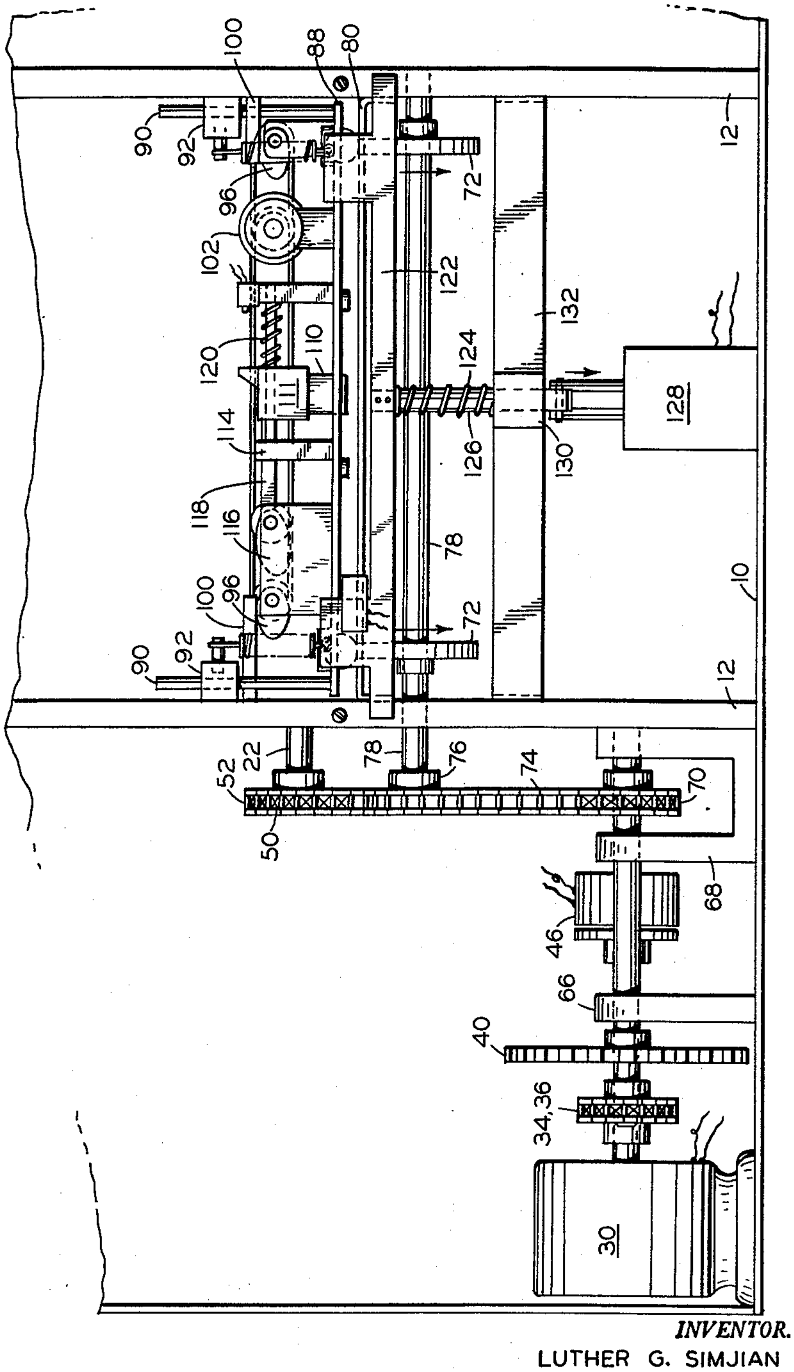
FIGURE 3 is a view taken along lines 3—3 of FIGURE 2.
Figure 4:
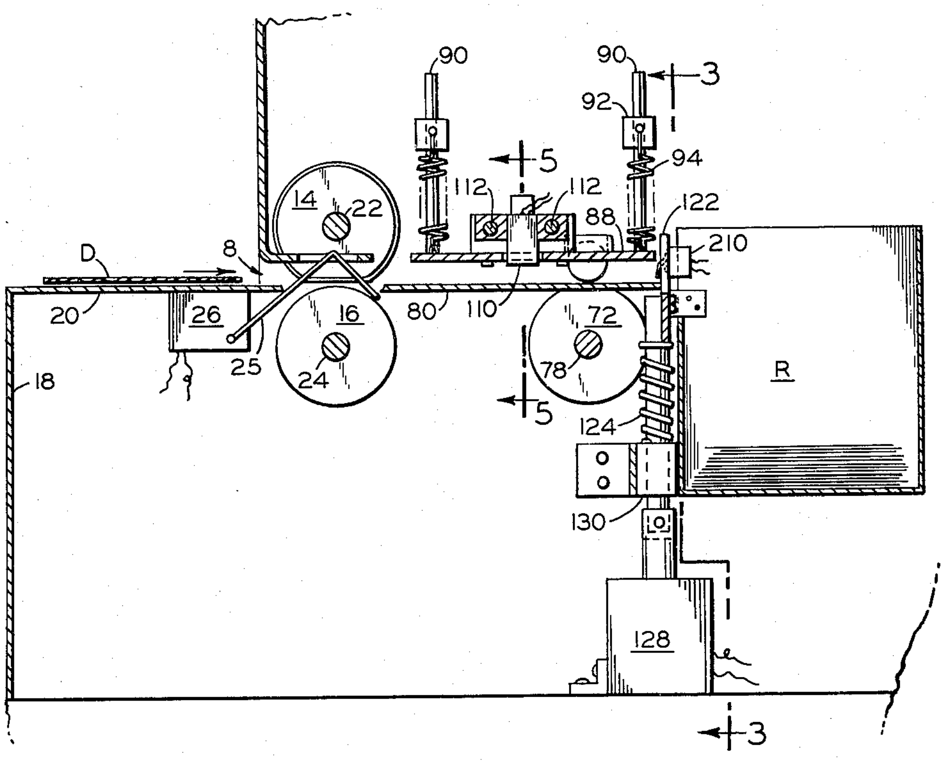
FIGURE 4 is a sectional view taken along lines 4—4 of FIGURE 2.

Referring to FIGURES 2 through 9, the feeding mechanism includes a base plate 10 which carries two spaced apart side plates 12 in which are journaled a set of feed rollers comprising an upper feed roller 14 and a lower feed roller 16. The rollers are positioned in proper cooperative relationship to each other to feed a document D therebetween as best seen in FIGURE 4. Ledge 20 is positioned substantially central between rollers 14 and 16 for guiding a document deposited on the surface of ledge 20 and manually advanced toward opening 8, into the space between the rollers.

Upper roller 14 is constructed from three axial, spaced apart, sections numbered 14*a*, 14*b* and 14*c* (FIGURE 2), all carried by shaft 22. Lower roller 16 is similarly constructed and carried by shaft 24. The individual sections of rollers 14 and 16 are so positioned upon their respective shafts that the spaces therebetween are in axial alignment with one another in order to operably receive extensions 25 and 27 belonging to stationary electrical sensing switches 26 and 28 respectively. The extensions are the actuating arms of snap-acting electrical switches commonly known as "Microswitches." When the leading edge of a document inserted between the rollers is disposed substantially parallel to the axis of rotation of both rollers, the document edge depresses the arms (dashed lines in FIGURE 9) and trips both switches whereby the rollers become actuated for feeding the document. Since the switches are connected in series, the axial spacing between the switch arms determines the minimum length of the document along its leading edge which causes the feeding mechanism to operate.

As shown more clearly in FIGURES 4 and 9, upper roller 14 is provided with a flattened portion 13 which, when the rollers are standing still, is disposed opposite lower roller 16. This arrangement produces a gap between the set of rollers for receiving therein the leading edge of the document. A set of fingers 54, depending from upper roller 14 and fastened by screw means to a flattened portion or slot in roller sections 14*a* and 14*c* respectively (FIGURE 2), constitutes a blocking or gate means for preventing a document being pushed manually through the gap while both rollers are standing still. Upon rotation of the upper roller in counterclockwise direction, in response to the actuation of both switches 26 and 28, the fingers move out of the way and the gap between the roller closes. This action clamps the document and causes the document to be fed toward the inside of the enclosure. The construction involving both feed rollers, the blocking means for preventing the document from being fed while the rollers are standing still, and the operation of the switches for sensing the condition when the leading edge of the document is substantially parallel to the axes of rotation of the rollers, has been shown and described in detail in my previous application for U.S. Letters Patent entitled: "Feeding Mechanism for Documents and the Like," Serial No. 93,720, filed March 6, 1961, now U.S. Patent No. 3,095,192 issued June 25, 1963.

Switches 26 and 28, when actuated by the leading edge of a document, energize a drive motor 30 (FIGURES 2 and 3) which rotates the upper document feed roller 14 through sprocket 32, chain 34, and a sprocket 16 affixed to a shaft 38. A gear 40 affixed to shaft 38 then transfers its motion to meshing gear 42 which is secured upon shaft 44, and through a magnetic clutch 46 upon the other end of shaft 44. The clutch is energized in response to the actuation of switches 26 and 28. Motion through the clutch is transfered to a sprocket 48 (FIGURE 8) and thence through a chain 50 to a sprocket 52 which is secured to shaft 22, the latter supporting feed roller 14.

A detent mechanism is provided to stop upper roller 14 after one complete revolution at its original position. This detent mechanism, as best seen in FIGURES 2 and 6, comprises an arm 56 pivoting about a stub shaft 58 and pressing against a flat peripheral portion 59 of cam 60 which is secured to roller shaft 22. In order to provide the force to properly index the roller, a helical tension spring 62 is anchored at a pin 63 which is secured in side plate 12, while the opposite end of the spring is attached to pin 64 carried by pivoting arm 56.

Shafts 38 and 44 are journaled in a support plate 66 (FIGURE 2) and in a U-shaped support 68. Shaft 38 carries also a sprocket 70 (FIGURE 8) for rotatably driving via chain 74, sprocket 76 and shaft 78, a pair of rollers 72, as best seen in FIGURES 3, 4 and 7.

A document receiving platform 80 is positioned to the rear of the document feed rollers 14 and 16 and is mounted at substantially the same height as ledge 20 in order to receive the document fed through the feed rollers. The platform is provided with a set of apertures in order to receive therein the top peripheral portion of the set of driving rollers 72, as seen in FIGURES 3 and 4. Rollers 72 are journaled underneath the platform and are positioned in such a manner that the topmost peripheral surface is substantially flush with the top surface of platform 80 in order that the rollers engage the underside of document D after the document has passed through feed rollers 14 and 16 as seen in FIGURE 7. A spherical member 84, such as a metal or porcelain ball, is disposed above each of the rollers 72 and is urged into engagement with the driving surface of the respective roller 72 by gravity. In the absence of a document D on platform 80, the spherical member is driven by the respective roller and when a document reaches the platform, the document becomes interposed between the rollers and spherical members, each spherical member providing engagement pressure between the document and rollers 72. By virtue of their inherent inertia, the spherical members, when rotating, will continue their motion to provide a driving force along the previously established direction.

The spherical members are caged in cylindrical projections 86 in a rectangular plate 88 which is spaced apart from but parallel to platform 80 and which plate is mounted for reciprocatory motion toward and away from platform 80 by four vertical guide rods 90, one in each corner. Blocks 92 attached to side plates 12 slidably receive therein guide rods 90. Helical tension springs 94 fastened to movable plate 88 and to fixed blocks 92 urge the plate toward its normally upward position, thereby leaving the platform 80 free for receiving a document.

Figure 5:
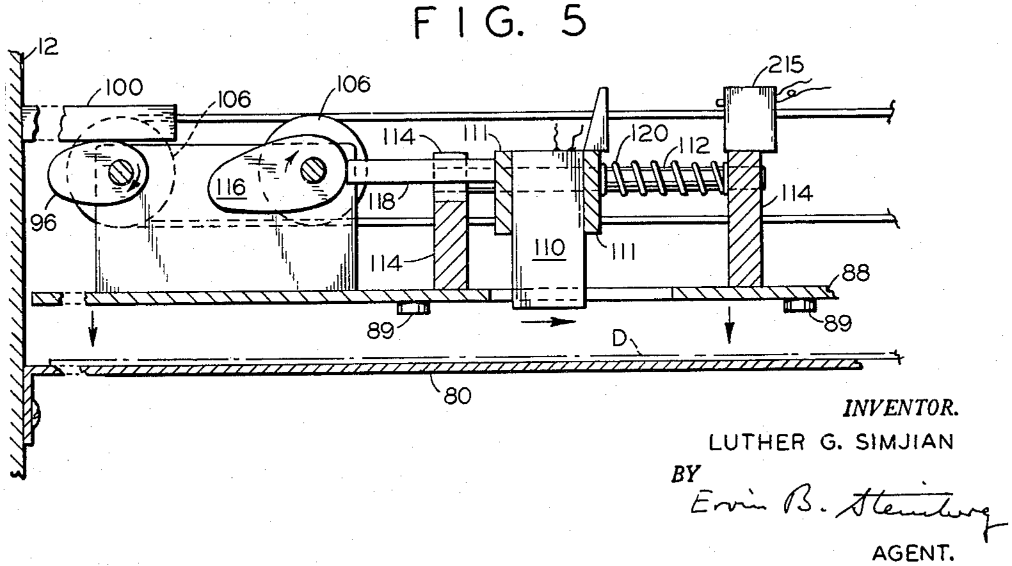
FIGURE 5 is a sectional view taken along lines 5—5 of FIGURE 4.

A pair of cams 96 (FIGURE 3) journaled in supporting plates 98, one cam being disposed at each end of movable plate 88, is adapted to press against a respective, horizontally extending stop 100 located above the cam and mounted to side plates 12, as best seen in FIGURES 2, 3 and 5. It will be apparent therefore, that rotation of cams 96 by a motor 102 which is mounted to the movable plate 88 through connecting belts 104 and pulleys 106, causes plate 88 to move downward where feet 89 (FIGURES 5 and 7) will engage the face of document D which at that time is disposed on platform 80. The downward motion of the movable plate and engagement of the document by the feet assures that the document remains flat and stationary. Due to the shape of the cams, the movable plate is maintained for a brief period of time in engagement with the document in order to permit a scanning means to communicate with document D via an aperture in the plate and produce signals which are indicative of the character of the document. After the scanning means has generated the necessary information, continuing rotation of the cams returns the plate to its raised position.

A scanning means such as light responsive means shown for instance in my Patent No. 2,941,187, entitled: "Apparatus and Method for Determining the Character of a Document," issued June 14, 1960, or any of the typical sensing means shown in the patent to Timms, No. 2,950,799, entitled: "Apparatus for Identifying Paper Money or the Like, if Genuine, and for Making Change or the Like," dated October 30, 1960, is disposed above the platform for producing signals responsive to the character of the document which signals in turn are used to determine whether the document is acceptable or should be rejected. In the example illustrated in FIGURES 2, 3 and 5, an electromagnetic scanning head 110 is carried by a block 111 which is mounted for lengthwise reciprocatory motion upon horizontal rods 112 and supports 114 on vertically moving plate 88. A cam 116 (FIGURES 2 and 5), also driven from motor 102, engages the end of a bar 118 secured to block 111 to move the scanning head 110 in a path parallel to the plane of platform 80 and against the force of a spring 120 which surrounds each rod 112. As cam 116 rotates by one revolution, scanning head 110 is driven back and forth in a plane substantially paralled to the surface of the document under investigation.

A gate 122 formed by a vertical plate defines the end of platform 80 and separates the document receiving platform 80 from a receptacle R. In its normal position, the gate is raised to occupy a blocking position, so that when a document is fed through feed rollers 14 and 16, the document is driven by rollers 72 and spherical members 84 against the gate 122 whereby the leading edge comes to rest in abutting fashion against the raised gate. In this way, the document is indexed on the platform and upon lowering the plate 88, the document is retained stationary so that scanning head 110 will scan substantially identical areas on each received document. A spring 124 (FIGURES 3 and 4) supports gate 122 in a raised position for blocking the path between the platform and receptacle R. A rod 126 is used to support the gate for reciprocatory motion and is connected between the vertical gate plate and a solenoid 128. A block 130 attached to a cross beam 132 mounted between side plates 12 serves to guide rod 126 along its vertical motion. When the scanning head has moved through its excursion from one end to the other (substantially one-half of its travel along its reciprocatory path), control means connected to the scanning head (not shown) receive signals and determine whether the document is valid and therefore acceptable. If this condition occurs, solenoid 128 is energized for moving the gate from its blocking position and simultaneously rollers 72 disposed underneath platform 80 are driven to move the document from the platform to the receptacle R for storage. In the event that the control means receiving signals from the scanning head determine that the document is not valid and therefore, should be rejected, gate 122 remains in its blocking position and rollers 72 as well as rollers 14 and 16 are driven in the opposite direction whereby the document is moved from platform 80 through feed rollers 14 and 16 and via aperture 8 to ledge 20. Thus, the document is returned from the sensing station to its original position outside the enclosure.

Figure 10:
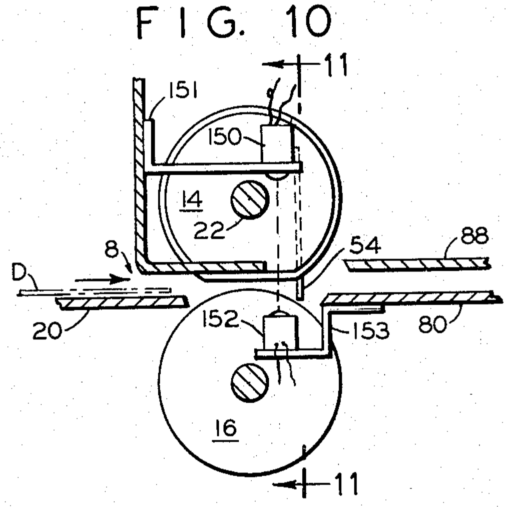
FIGURES 10 is a sectional view of a modification of the present invention taken along lines 10—10 of FIGURE 11.
Figure 11:
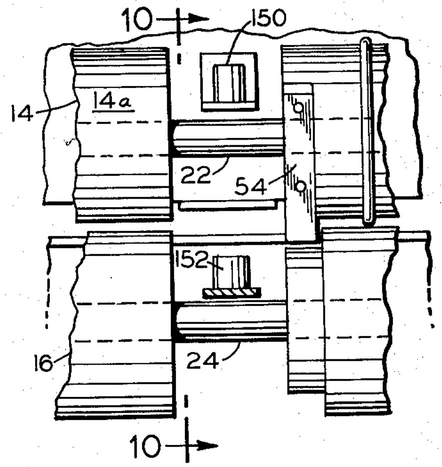
FIGURE 11 is a view taken along lines 11—11 of FIGURE 10.

FIGURES 10 and 11 depict a variation of the sensing means which determine the condition when the leading document edge is substantially parallel to the axes of rotation of rollers 14 and 16. In place of switch arms 25 and 27 which are physically actuated by the leading document edge, a pair of spaced light sources and complementary photo-electric sensing means is provided. FIGURE 10 shows one of the stationary light sources 150 mounted to a bracket 151. Underneath the source there is mounted a photocell 152 fastened to bracket 153. This arrangement of course, is duplicated at the other sensing station. A document inserted between the feed rollers 14 and 16 will break the light path. The photocells are connected in series so that both light paths must be interrupted before actuation of motor 30 occurs. The electrical circuit accomplishing this task is well known in the art and need not be described in detail.

Figure 12:
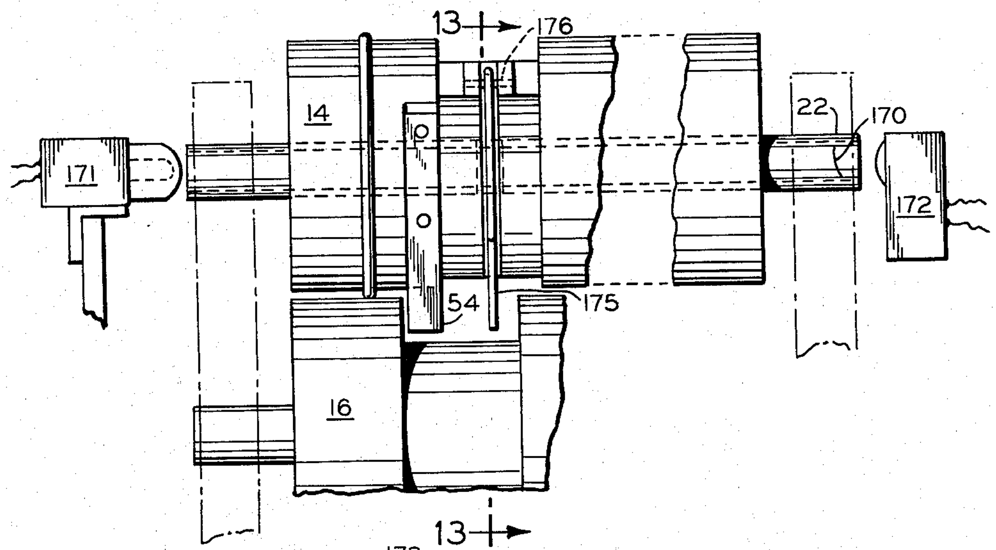
FIGURE 12 is a view similar to FIGURE 11 but expanded to incorporate still another modification of the present invention.
Figure 13:
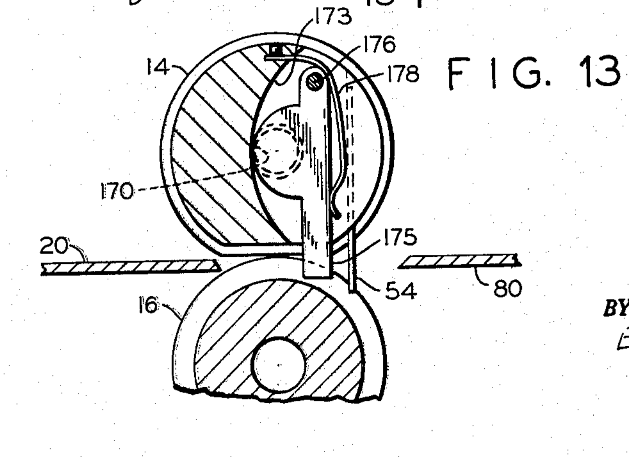
FIGURE 13 is a view taken along lines 13—13 of FIGURE 12.

A further alternative construction for the document sensing means is shown in FIGURES 12 and 13. Shaft 22 has been equipped with a longitudinal bore 170 to provide a light path between a source of light 171 and a photoelectric sensing means 172, both being disposed at opposite ends of the shaft. At the locations formerly occupied by switch arms 25 and 27 there is milled into roller 14 a respective transverse slot 173 which slot is of such depth as to intersect the longitudinal bore. An arm 175 is mounted in each slot and fastened thereto by means of a transverse pin 176 so that each arm rotates with roller 14 when the latter is set into motion. Each arm is of such configuration as to intercept the light path through bore 170 and also to depend into the space between rollers 14 and 16. A leaf spring 178 urges the associated arm 175 in the direction toward ledge 29, causing each respective arm to intercept the light path along the bore.

When a document is inserted into the gap between feed rollers 14 and 16, the leading document edge causes each arm 175 to be forced against the bias of respective spring 178 and as the arms move, pivoting about pin 176, light from source 171 reaches sensing means 172, thereby establishing an electrical circuit to the drive motor 30. It will be apparent that in order for light to reach photoelectric sensing means 172, both arms 175 must be moved from their respective light intercepting positions against the force exerted by leaf springs 178. Arms 175 rotate with roller 14 and are restored to their original position as soon as the rollers occupy their starting position. Fingers 54, as shown previously, constitute the gate or blocking means and prevent a document being passed through the gap when the rollers are standing still.

*Summary of Operation*

Figure 14:
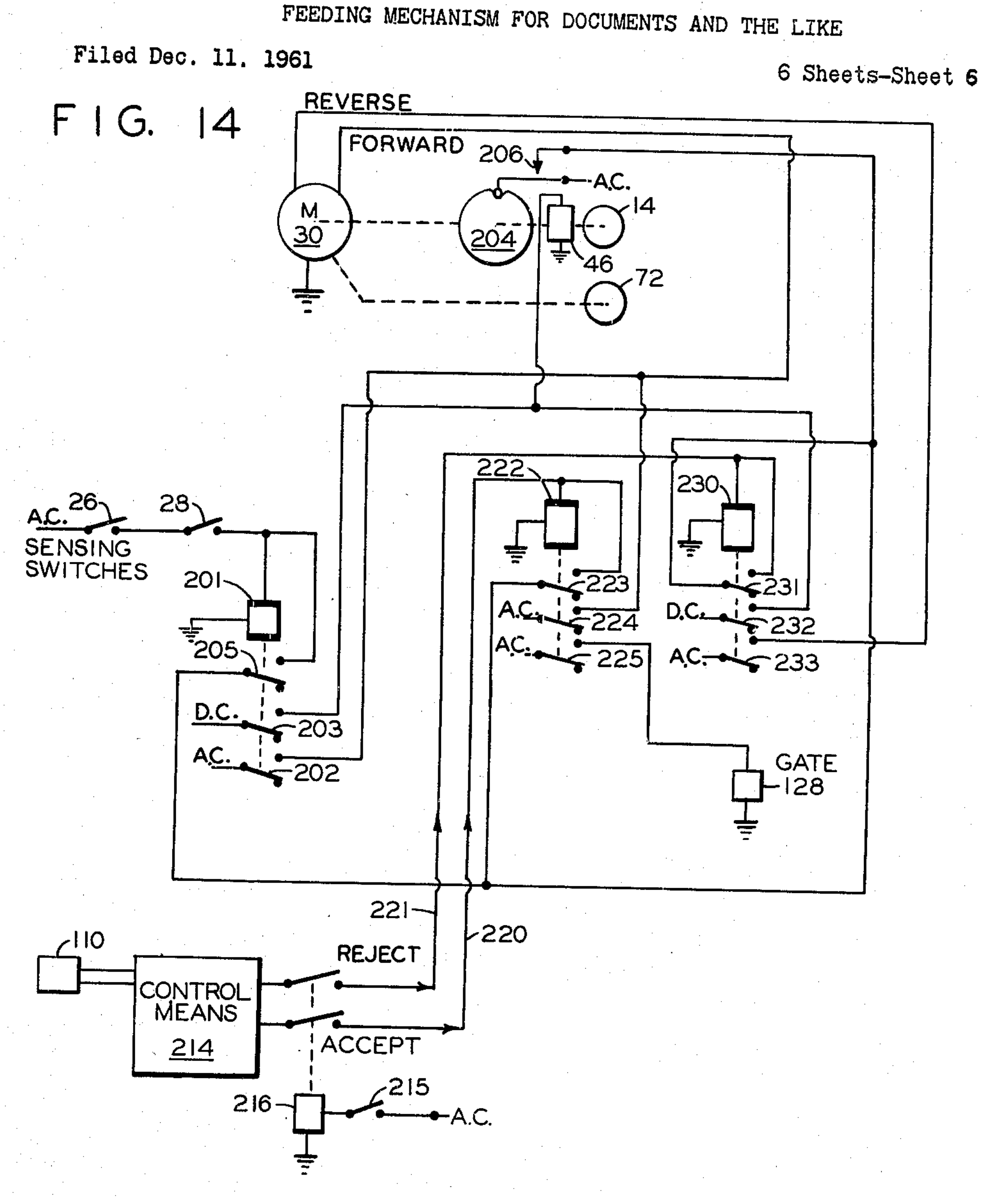
FIGURE 14 is an electrical circuit diagram.
Figure 15:
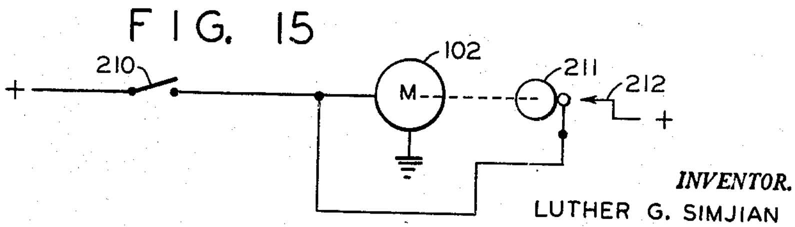
FIGURE 15 is a further electrical circuit diagram of portions coacting with the instant mechanism.

The operation of the feeding mechanism will briefly be described in conjunction with FIGURES 14 and 15 which are the schematic electrical circuit diagrams.

When the leading document edge operates sensing means 26 and 28, relay 201 becomes energized. Contact 202 associated with relay 201 closes and applies energy to feed roller motor 30 causing the motor and a timing cam 204 to rotate. This motor is adapted to operate bidirectionally and at this moment is caused to feed the document into the enclosure. Contact 203 applies energy to clutch 46 to drive upper feed roller 14. Contact 205 serves to maintain relay 201 energized although switches 26 and 28 open as the document leaves the feeding station since this contact is in series with a contact 206 operated by timing cam 204. Motor 30 drives also rollers 72 disposed underneath platform 80.

Timing cam 204 and rollers 14 and 16 are dimensioned such that the rollers revolve through one revolution and that this amount of rotation is sufficient to drive the document D against gate 122 which separates platform 80 from receptacle R.

As the leading edge of the document strikes the raised gate, switch 210 (see also FIGURE 4) is tripped which in turn applies energy to motor 102 disposed on plate 88. This motor by a suitable gear mechanism is coupled to a cam 211 which operates a switch 212 (FIGURE 2) to maintain the motor running for one cycle which is the amount of time required by the sensing head to move through its reciprocatory cycle.

As the sensing head 110 is driven from its right position as seen in FIGURE 2 to its extreme left position, it provides to a control means 214 a train of signals responsive to the character of the document. The signals are either of predetermined characteristic or deviate from the predetermined characteristic and to this end, control means 214 may take the form of typical accept-reject circuits shown for example in the patent to Timms supra; Simjian No. 2,941,187; Relis No. 2,894,247; Shepard No. 2,663,758; Eldredge No. 3,000,000; or others known in the prior art. As the sensing head 110, driven in response to rotation of motor 102 reaches its extreme left position, a projection on block 111 momentarily operates switch 215 which in turn energizes relay 216. When the sensing head leaves its extreme forward position, switch 215 automatically opens. During the time that switch 215 is closed, control means 214 supplies a signal either to conductor 220 signifying a desired and therefore acceptable document, or to conductor 221 signifying that the document is rejected. An "accept" signal on conductor 220 actuates relay 222 which has three associated contacts numbered 223, 224, and 225. Contact 224 energizes motor 30 which in turn drives rollers 72 in the forward direction to accomplish document transfer from platform 80 to receptacle R. Contact 225 energizes gate solenoid 128, causing the gate to be lowered, taking along with it switch 210. Contact 223 maintains solenoid 222 energized for a length of time, as determined by timing cam 204 coacting with switch 206.

In the event that the control means 214 sends a signal along conductor 221, relay 230 becomes energized which has three associated contacts numbered 231, 232 and 233. Contact 233 applies energy to motor 30, causing the motor to operate in the reverse direction. Contact 232 energizes clutch 46 for causing feed rollers 14 and 16 to be driven. Also rollers 72 are driven by the motor, thus causing the document to be fed from platform 80 and returned through feed rollers 14 and 16 and aperture 8 to ledge 20. Contact 231 in conjunction with contact 206 maintains relay 230 energized for the period of time as determined by timing cam 204.

It will be apparent that the sensing means may comprise optical means, magnetic means or any of the other suitable means as are apparent in the prior art. The control means coacting with the sensing means will be selected to suit the respective conditions. When the apparatus is used for its primary purpose, namely the recognition and verification of paper currency, the control means is a comparatively simple device since only one or two significant numerals or characteristics are subject to recognition. The precise type of sensing means and control circuit employed does not form however, a part of the foregoing invention.

While there has been described and illustrated a certain preferred embodiment of the present invention and several modifications thereof, it will be apparent to those skilled in the art that various further changes and modifications may be made therein without departing from the spirit and intent of the present invention which should be limited only by the scope of the appended claims.

What is claimed is:

1. A feeding mechanism for documents and the like comprising:

a set of rollers adapted to feed a document therebetween;

motive means coupled to at least one of said rollers for causing a document received between the rollers to be conveyed therethrough;

sensing means disposed at said rollers and connected to said motive means for sensing the condition when the leading edge of the document is substantially parallel to the axis of rotation of said rollers and causing actuation of said motive means in response to said condition;

blocking means for blocking the path through said rollers when the rollers are standing still;

a receiving platform and a receptacle disposed behind said rollers and adapted for receiving a document fed through said rollers;

a movable gate disposed between said platform and said receptacle;

said gate when in a blocking position preventing the document from being fed from the platform to the receptacle, causing the document to come to rest on said platform between said rollers and said gate with the leading document edge abutting against the gate;

a scanning means disposed for communication with the document to produce signals responsive to the character of the document when the latter is on the platform;

control means connected to said scanning means for receiving the signals therefrom;

document drive means disposed at said platform which means comprise a set of spaced rollers journaled underneath the platform and a set of spherical members thereabove;

the periphery of each roller adapted to engage the underside of a document disposed on said platform and each spherical member, in the absence of a document, being in rolling contact with an associated roller and adapted to be lifted from the roller by a document when the latter in response to being fed through said set of rollers reaches said platform and is placed between said rollers and spherical members;

said control means adapted to cause, in response to a predetermined signal received at said control means, selective operation of said latter rollers in a first direction and removal of said gate means from its blocking position for causing the document to move from the platform past said gate means to said receptacle, and causing in response to a signal deviating from said predetermined signal, motion of said rollers at said platform and of said pair of feed rollers in a second direction whereby to move said document from the platform and return through said set of feed rollers.

2. A feeding mechanism for documents and the like as set forth in claim 1 wherein said sensing means disposed at said rollers comprise a set of spaced switches which are actuated by the leading edge of the document.

3. A feeding mechanism for documents and the like as set forth in claim 1 wherein said sensing means disposed at said rollers comprise a set of spaced light responsive means receiving light from a source of illumination and said motive means are actuated when the document intercepts the light path to the light responsive means.

4. A feeding mechanism for documents as set forth in claim 1 wherein said movable gate is mounted for intercepting the plane of the platform which receives the document.

5. A feeding mechanism for documents and the like comprising:

a set of opposing feed rollers adapted to feed a document therebetween;

means causing said rollers when standing still to have a gap therebetween for receiving a document and said rollers closing said gap when rotating whereby a document inserted with its leading edge in a gap is fed through the rollers;

gate means preventing a document from being fed through the gap in the absence of rotation of said rollers;

motive means causing said rollers to rotate when the leading edge of the document inserted in the gap is disposed substantially parallel to the axes of said rollers;

sensing means disposed in the gap for sensing the condition when the leading document edge is parallel to the axes of said feed rollers and said sensing means connected to said motive means and causing actuation of said motive means in response to the existence of said condition, whereby the document is fed through the rollers;

a document receiving platform disposed behind the feed rollers for receiving a document fed through said rollers;

document drive means disposed for feeding said document on said platform and said drive means comprising a pair of rollers and a corresponding pair of spherical members;

each roller journaled underneath the platform and adapted to reach with a portion of its peripheral surface to the top surface of the platform for engaging the underside of the document disposed on said platform;

a plate disposed above said platform;

said plate provided with means for retaining said spherical members;

each spherical member disposed to be engaged by the peripheral surface portion of an associated roller for being driven thereby in the absence of a document, yet being free to be lifted off said portion when a document fed through the feed rollers reaches said platform and becomes interposed between said rollers and respective spherical members whereby the spherical members urge the document into engagement with the rollers;

a second gate means disposed at said platform and distanced from said feed rollers for causing, when in a blocking position, the document to come to rest on said platform between said second gate means and feed rollers with the leading edge of the document adjacent to said gate means;

a movable scanning means supported on said plate for communication with the document;

means for moving said scanning means relative to the document whereby said scanning means is adapted to produce signals responsive to the character of the document disposed on the platform;

control means connected to said scanning means for receiving the signals;

said control means connected also to said roller drive means for causing selective operation of said rollers and removal of said second gate means from its blocking position for causing the document to move from said platform past said gate means in response to predetermined signals from said scanning means, and in the absence of predetermined signals, causing said gate means to remain in said blocking position while causing said roller drive means to feed said document from the platform through the set of feed rollers in a direction opposite to the document's first motion past the same rollers.

6. A feeding mechanism for documents and the like comprising:

a roller;

means causing said roller to rotate whereby the roller is adapted to feed a document past its peripheral surface;

said roller provided with longitudinal bore and a set of transverse slots, one slot spaced from the other along the longitudinal axis of said roller and said slots intersecting the bore;

a light source disposed at one end of said bore and a light responsive means disposed at the other end for receiving light from said source;

each of said slots provided with a pivotally mounted arm which is shaped and mounted for intercepting the light path along the bore from said source to said light responsive means;

means biasing each of said arms toward said bore for intercepting said light path;

said arms adapted to be moved from said light intercepting position and against the force exerted by the biasing means in response to the leading edge of a document being pushed against said arms whereby upon a sufficient amount of motion of each arm the light responsive means receives light from said source;

said light responsive means connected to said means causing rotation of the roller for effecting rotation thereof and feeding the document past the roller surface in response to the light responsive means being in communication with the light source.

7. A feeding mechanism for documents and the like comprising:

a pair of opposite rollers adapted to feed when rotating a document inserted therebetween through the rollers;

means causing said rollers to rotate when the leading edge of a document inserted between the rollers is disposed substantially parallel to the axes of rotation of said rollers;

one of said rollers provided with a longitudinal bore and a set of transverse slots, one slot spaced from the other along the longitudinal axis of said roller and said slots intersecting the bore;

a light source disposed at one end of said bore and a light responsive means disposed at the other end for receiving light from said source;

each of said slots provided with a pivotally mounted arm which is shaped and mounted for intercepting the light path along the bore from said source to said light responsive means;

means biasing each of said arms toward said bore for intercepting said light path;

said arms adapted to be moved from said light intercepting position and against the force exerted by the biasing means in response to the leading edge of a document being pushed against said arms whereby upon a sufficient amount of motion of each arm the light responsive means receives light from said source;

said light responsive means connected to said means causing rotation of the rollers for effecting rotation thereof and feeding the document through the rollers in response to the light responsive means being in communication with the light source;

and gate means preventing a document from being fed through the rollers in the absence of rotation of said rollers.

8. A feeding mechanism for documents and the like comprising:

a pair of opposite rollers adapted to feed when rotating a document inserted therebetween through the rollers;

means causing said rollers to rotate when the leading edge of a document inserted between the rollers is disposed substantially parallel to the axes of rotation of said rollers;

one of said rollers provided with a longitudinal bore and a set of transverse slots, one spaced from the other along the longitudinal axis of said roller and said slots intersecting the bore;

a light source disposed at one end of said bore and a light responsive means disposed at the other end for receiving light from said source;

each of said slots provided with a pivotally mounted arm which is secured for rotation with the respective roller, and shaped and mounted for intercepting the light path along the bore from said source to said light responsive means;

means biasing each of said arms toward said bore for intercepting said light path;

each of said arms adapted to be moved from said light intercepting position and against the force exerted by the biasing means in response to the leading edge of a document being pushed against said arms whereby the light responsive means receives light from said source when each arm has moved from said light intercepting position;

said light responsive means connected to said means causing rotation of the rollers for effecting rotation thereof and feeding the document through the rollers in response to the light responsive means being in communication with the light source;

and gate means preventing a document from being fed through the rollers in the absence of rotation of said rollers.

9. A feeding mechanism for documents as set forth in claim 8 wherein each pivotally mounted arm is secured in the respective slot.

10. A feeding mechanism for documents as set forth in claim 8 wherein the spacing between said arms determines the minimum length of the leading edge of a document causing rotation of said rollers.

11. A feeding mechanism for documents and the like comprising:

a pair of opposite, parallel feed rollers;

said rollers when standing still having a gap therebetween for receiving a document and when rotating closing said gap and causing the document to be fed through the rollers;

means causing said rollers to rotate when the leading edge of a document inserted in the gap is disposed substantially parallel to the axes of rotation of said rollers;

one of said rollers provided with a longitudinal bore and a set of transverse slots, one spaced from the other along the longitudinal axis of said roller and said slots intersecting the bore;

a light source disposed at one end of said bore and a light responsive means disposed at the other end for receiving light from said source;

each of said slots provided with a pivotally mounted arm which is secured for rotation with the respective roller and shaped and mounted for intercepting the light path along the bore from said source to said light responsive means;

means biasing each of said arms toward said bore for intercepting said light path;

each of said arms adapted to be moved from said light intercepting position and against the force exerted by the biasing means in response to the leading edge of a document inserted in the gap moving said arms whereby the light responsive means receives light from said source only when each arm has moved from said light intercepting position;

said light responsive means connected to said means causing rotation of the rollers for effecting rotation thereof and feeding the document through the rollers in response to the light responsive means being in communication with the light source;

and gate means preventing a document from being fed through the gap between the rollers in the absence of rotation of said rollers.

References Cited in the file of this patent

UNITED STATES PATENTS

| | | |
|---|---|---|
| 2,092,166 | Kettles | Sept. 7, 1937 |
| 2,302,067 | Spiess | Nov. 17, 1942 |
| 2,646,717 | Selgin | July 28, 1953 |
| 2,960,377 | Simjian | Nov. 15, 1960 |
| 2,995,976 | Weingart | Aug. 15, 1961 |